United States Patent [19]

Nelson

[11] 4,198,471
[45] Apr. 15, 1980

[54] CONTROLLED GLOSS PIGMENT SYSTEM FOR COATING PRINTING PAPERS AT PAPER MACHINE CALENDERING CONDITIONS

[75] Inventor: George R. Nelson, Issaquah, Wash.

[73] Assignee: Weyerhaeuser Company, Tacoma, Wash.

[21] Appl. No.: 893,647

[22] Filed: Apr. 4, 1978

Related U.S. Application Data

[63] Continuation of Ser. No. 754,791, Dec. 27, 1976, abandoned.

[51] Int. Cl.$^2$ .................... B05D 3/02; B05D 3/12; B32B 27/10; B32B 27/42
[52] U.S. Cl. .................... 428/513; 260/17.4 ST; 427/361; 427/391; 428/530; 525/157; 525/156; 525/164
[58] Field of Search ............... 427/361, 391; 260/845, 260/846, 847, 848, 853, 854, 17.4 ST, 855; 428/514, 513, 530, 531

[56] References Cited

U.S. PATENT DOCUMENTS

| | | | |
|---|---|---|---|
| 3,028,258 | 4/1962 | Rice | 427/361 X |
| 3,281,267 | 10/1966 | Rice | 427/391 X |
| 3,578,493 | 5/1971 | Smith | 427/391 X |
| 3,779,800 | 12/1973 | Heiser | 427/391 X |
| 3,853,594 | 12/1974 | Moroff et al. | 427/361 X |

Primary Examiner—Michael R. Lusignan

[57] ABSTRACT

The combination of a thermoplastic polymer and a thermosetting polymer, provides a pigment system for producing coated printing papers. The thermoplastic polymer and thermosetting polymer, suspended in well-known coating binders and carriers, is applied to the web substrate on a standard paper machine. The amount of thermoset, preferably at least about 25% by weight of the pigment solids, improves ink receptivity and allows adjustable control of finished paper gloss. The amount of thermoset added to the pigment system is limited, however, preferably below about 75% by weight of the pigment solids, so that the finished printing paper obtains a Gardner 75° gloss of at least about 40, at calendering pressures of less than 500 PLI.

2 Claims, No Drawings

CONTROLLED GLOSS PIGMENT SYSTEM FOR COATING PRINTING PAPERS AT PAPER MACHINE CALENDERING CONDITIONS

This is a continuation of application Ser. No. 754,791, filed Dec. 27, 1976, abandoned.

BACKGROUND OF THE INVENTION

This invention relates to paper coating pigment systems useful in producing printing grade papers. More particularly, this invention relates to lightweight polymer coatings, capable of producing printing papers of good ink receptivity and high gloss, obtainable under the relatively mild calendering conditions prevalent in standard paper machine finishing operations.

The principle purpose of a printing coating is to fill-in the voids between paper fibers and bury them below a bright surface capable of uniformly absorbing printing inks. Typical printing paper coatings comprise a pigment that forms the printing surface, a binder for securing the pigment to the paper web substrate, and a carrier or solvent that permits application of the coating to the substrate in a liquid form. Conventional high-gloss printing paper is manufactured by applying to the sheet aqueous emulsion coatings comprised of natural or thermoplastic binders and inorganic pigments. Common pigments are clays, titanium dioxide, and other white, bright, finely divided inorganic solids. Common binders are starches, casein, or latexes of copolymers and butadiene and acrylonitrile, vinyl acetate and the like. The carrier is generally water or other solvent that does not react with the pigment and is removable during the paper finishing processes by the application of heat.

To achieve the high gloss desirable for printing grade papers, a cast coating technique may be used in which the fluid coating, after being placed on the substrate, is contacted with a nonadhering surface having a high finish substantially equal to that of the required finished paper, whereupon the coating is dried into the nonplastic state. The problem with cast coating is that usually only slow machine speeds are possible and the tendency of coating weights to be in excess of 10 lbs./3,000 ft.$^2$, adding considerable cost to the finished paper.

A most desirable method of coating to achieve a printing grade paper would be to apply the coating while the web substrate is still on the paper machine. While it is possible to apply the coating to the web while it is on the paper machine, through transfer rolls and the like, it is generally not possible to obtain the desired gloss under the relatively mild calendering conditions that exist at the end of the paper machine. With standard inorganic coating pigments, the web generally must be supercalendered off of the paper machine to achieve adequate gloss and smoothness. Supercalendering is an additional operation which adds cost to the finished paper. Also, inorganic pigments are often brittle, subject to dusting or otherwise do not perform well under high calendering pressures.

As a means of solving some of these difficulties, a portion of the binder may be replaced with a thermoplastic material. For example, in Rice, U.S. Pat. No. 3,281,267, a coating containing kaolin clay or titanium dioxide is provided with a thermoplastic and elastomeric binder in addition to the usual casein or starch, to impart better coating flexibility at conditions necessary to achieve high gloss and opacity. Increasing the amount of thermoplastic in the pigment-binder mix, to effect a replacement of a portion or even all of the inorganic pigment is recognized by Heiser in U.S. Pat. No. 3,779,800 as improving gloss while other printing paper characteristics remain in the desirable range. Heiser notes, however, that careful control of temperature in drying or finishing by calendering or supercalendering is critical so that the temperature of the coating does not exceed the softening point of the thermoplastic. If the temperature or calendering pressure rises too high, the thermoplastic particles will tend to lose their discrete character and flow together, resulting in a rapid decrease in opacity and brightness of the coated paper as the plastic becomes more like a continuous transparent film.

A completely thermoplastic pigmented coating allows achievement of gloss under the relatively mild calendering conditions which exist at the end of the paper machine, but there remains the tendency of the coating to become transparent, as noted above, and results in lower opacities than if inorganic pigments are used. Thermoplastic pigments also tend to abraid from the paper substrate. Ink receptivity for thermoplastic coatings is generally poor as the particles are not readily wetted or absorbed by thermoplastic materials even when careful control of temperatures and calendering pressures is maintained to ensure their particulate characteristics.

SUMMARY OF THE INVENTION

The instant invention is an improved pigment system for use in combination with a paper coating of the type wherein pigments, suspended in a binder and carrier, are applied to a paper web substrate, the improved pigment system comprising a thermoplastic polymer and a thermosetting polymer, wherein the amount of thermoset is adjusted to yield finished printing paper characterized by a minimum Gardener 75° gloss of 40 and K&N values of less than 70.

An improved printing paper product is described consisting of the inventive pigment system attached to a paper substrate using common binders. A method of making a printing paper upon a standard paper machine is also described in which the inventive pigment system is applied to a substrate on the paper machine upon which the substrate was formed, followed by calendering under standard paper machine conditions to obtain acceptable printing paper finishes.

The coated paper, because of the inventive coating pigment, attains adequate gloss under the relatively mild calendering conditions prevalent upon standard paper machines. The finished paper gloss may be adjusted by varying the percentage of thermoset in the pigment system.

The inventive printing paper pigment provides a lighter-weight coating than those coatings containing inorganic pigments, improving density of the resulting sheets. Better sheet bulk is obtained with the inventive pigment system than with the inorganic coatings. Sheets containing the thermoset show a somewhat less increase in apparent density than clay coated sheets as calendering pressures increase.

DETAILED DESCRIPTION OF THE PREFERRED EMBODIMENTS

The preferred composition of the inventive pigment system comprises a thermoplastic polymer and a thermosetting polymer, applied as an emulsion or slurry of pigment system, binders, carriers and other additives designed, for example, to stabilize the emulsion or otherwise adjust its characteristics for a particular application or specific coating equipment.

The thermoplastic polymer component may be any of those commonly used in paper coating having a softening point or glass transition temperature of 105° C. and characterized by a spherical particle shape and particle size range of 0.03–0.5 micron. Suitable polymers and copolymers can be obtained from monomers of: styrene, vinyl chloride, vinylidene chloride, vinyl acetate, methyl acrylate, butyl acrylate, other acrylate monomers, butadiene (copolymerized at low monomer concentrations of 15% or less), acrylonitrile, and the like.

The thermosetting pigment component may be any particulate thermoset that is insoluble in water, polymerized to an infusible, insoluble, inert state. The particle characteristics may be described as spherical in shape of 0.1–15 micron average particle size. Thermoplastic materials and naturally occurring polymers that have been cross-linked and polymerized to the insoluble infusible state are suitable. Examples of preferred thermosetting pigments are: phenolics, melamine formaldehyde, urea formaldehyde, cross-linked polystyrene, cross-linked polyesters, and water-insoluble starch granules.

The carrier used with the inventive pigment system is usually water, but any carrier may be selected that does not interact adversely with the pigment, binder components or application technique. Since the carrier is substantially removed from the coated paper in the finishing process through the application of heat, the solvent selected should have a relatively low boiling point, below that of the softening point of the thermoplastic material.

The binder selected for the paper coating composition may be any of those well known in the paper coating art, such as: naturally occurring starches, caseins or thermoplastic latexes. Combinations of the binders may be used so long as there are no adverse effects upon the other coating components. The binder material is usually dissolved in the carrier prior to the addition of the pigment system.

EXAMPLES

The following examples show typical compositions of this invention, compared with inorganic pigments and a 100% thermoplastic pigment coating. The composition of the solids component of the test coatings is shown in Table I. As noted in Table I, the thermoplastic selected is a polystyrene pigment manufactured by Monsanto having a spherical particle shape and a size distribution of 0.03–0.5 micron in diameter. The thermosetting component is urea-formaldehyde pigment manufactured by Cabot Corporation having a spherical particle shape and a size distribution of 0.1–15 microns. The three control coatings represent the well-known pigments of clay, titanium dioxide and thermoplastic pigment, respectively. An identical binder-carrier system was used for all of the examples shown in Table I. The binder used comprised a 50–50 mixture of gum starch and a polystyrene-butadiene latex. The carrier consisted of water.

As indicated in Table II, the Brookfield viscosities of the inventive coatings are substantially in excess of those obtained for the standard clay coatings or the thermoplastic pigment coating. The aqueous coating formulations show substantial increases in viscosity values in response to increases in the proportions of thermosetting pigment component. Thus, it is necessary when applying the inventive coatings to generally apply them at lower percent solids than for the coatings known in the art. The requirement depends somewhat on the method utilized in applying the coating to the paper substrate. In the past, inorganic coatings have generally been applied at the 40% solids level. It has been found, however, that the inventive coating may be successfully applied at lower coating solids levels, preferably in the 15–20% solids range.

The coating formulations outlined in Table I were applied to a sized bleached paper, CC Base J Rawstock manufactured by Weyerhaeuser Company of Tacoma, Washington, at 7–9 pounds per 3,000 ft.$^2$ using a Meyer rod applicator. The coatings were applied at the solids contents indicated in Table II.

The coated sheets were calendered, under conditions selected to substantially duplicate calendering conditions prevalent at the drying and calendering sections of a typical paper machine, using a laboratory super calender set at 250 and 500 pounds per lineal inch (PLI) at a temperature of 100° F. The sheets were given two and four nips per side at each pressure. Sheets were then tested for gloss, opacity, K&N ink receptivity, brightness and density. The measured results are indicated in Table III.

Each coated paper was measured to determine "gloss" or ability to reflect light, an important printing paper characteristic. Gloss is generally expressed as a ratio of the intensity of light reflected from the specimen to that similarly reflected from an arbitrary standard, for a specified and equal angles of incidence and reflection. The Gardener 75° gloss values indicated in Table III were measured in accord with TAPPI Test Method T480 TS-65. Examination of the measured values shown in Table III indicates that as the percentage of thermosetting component of the pigment is increased, there is a substantial decrease in Gardener 75° gloss. Where the thermoset comprises 75% of the pigment solids, gloss at low calendering pressures is below that of the inorganic samples. Event at the 4/500 PLI calendering conditions, gloss of Example 3 was marginal. Samples 1 and 2, however, show excellent gloss at even the lowest calendering severity. The 100% thermoplastic pigment coating showed the best gloss, but at the higher calendering pressures began to abraid from the surface substrate. It was found that increasing the amount of plastic pigment in the coating as well as increasing the severity of the calendering conditions greatly increased the result in gloss of the sheet as compared to clay and titanium dioxide.

Changes in gloss were accompanied without any substantial change in the opacity of the resulting sheet. Neither increasing the plastic pigment level nor reducing the thermoset level had a substantial impact on opacity. All of the test sheets had, in fact, comparable opacities, although somewhat less than the titanium dioxide-coated sheet. The brightness of the test sheets were also good for all sheets and unresponsive to changes in the pigment compositions.

The ink wettability or receptivity of the test coating is an important characteristic of a printing grade paper that is significantly improved by the presence of thermosetting component of the pigment system. A common industry test of ink receptivity is K&N Ink Brightness, described in TAPPI Test Method RC19. The K&N ink test consists of an oil-soluble dye in a varnish-base ink applied in excess to a 1–2 square inch area of test paper. The ink is removed after two minutes and the surface wiped dry. Using a Photovolt Photoelectric Reflection Meter Model 610 manufactured by Photovolt Corp. of New York, New York, with a green filter, the meter is set to read 100 for the brightness of the un-inked stock being evaluated. The brightness of the previously inked test area is then read directly. Low numbers indicate greater ink receptivity.

Referring to Table III, the test samples show that ink receptivity was substantially better for the thermoplastic-thermoset pigment blends than for the clay, titanium dioxide, or 100% thermoplastic pigment sheets. Also the ink receptivity was found to increase as the amount of thermosetting material in the sheet increases.

Comparing the Gardener 75° gloss and K&E brightness values in Table III, for the three samples of this invention, in which thermosetting component increases from 25% in Example 1 to 75% in Example 3 of the pigment system solids, it is seen that while there is an increasing improvement in ink receptivity indicated by the K&N value measurement that there is a decrease in Gardener 75° gloss as the proportional amount of thermosetting material in the pigment is increased. At the 75% by weight of the pigment system thermoset level, while superior ink receptivity was obtained, gloss at even the higher calendering conditions was marginal when compared to gloss values for the inorganic formulations. Thus, the invention provides the option of compromising between ink receptivity and gloss without any apparent effect in opacity or brightness as the proportions of pigment components are changed. It is noted that increasing calendering decreased receptivity although it improved gloss.

The apparent densities of the sheets were also determined at various calendering conditions and are indicated in Table III. Important benefits in the manufacture of printing papers and their resulting qualities are derived from the low-density characteristics of the inventive pigment system when compared to inorganic pigments. Densities of typical clays and TiO2 are about 2.5 gm/cc and 3.6 gm/cc, respectively, while a typical thermoset such as Cabot UF-200 urea-formaldehyde and Monsanto RX 1672 polystyrene are about 1.45 gm/cc and 1.05 gm/cc, respectively. Therefore, applying a given coating weight to a substrate results, in the case of the inventive pigment, in a sheet having higher "bulk" or thickness than with the heavier inorganic pigment. High bulk imparts "stiffness" to the coated sheet, a desirable characteristic for printing papers resulting in better handling and feeding in printing equipment and presses. The inventive pigment system also retains its bulk better than clay coatings which tend to compress in response to calendering pressures as indicated by the density data in Table III.

Other variations within the teaching of the above inventive coating pigment will be evident to those skilled in the art.

TABLE I

| | SOLIDS COMPONENTS OF TESTED COATINGS [PARTS] | | | | |
|---|---|---|---|---|---|
| Coating | Polystyrene[1] | Urea-Formaldehyde[2] | Binder[3] | Clay | TiO$_2$ |
| Example 1 | 75 | 25 | 16 | — | — |
| Example 2 | 50 | 50 | 16 | — | — |
| Example 3 | 25 | 75 | 16 | — | — |
| Inorganic 4 | — | — | 16 | 100 | — |
| Inorganic 5 | — | — | 16 | 50 | 50 |
| Thermoplastic 6 | 100 | — | 16 | — | — |

Notes:
[1]RX 1672 pigment manufactured by Monsanto Chemical of St. Louis, Missouri.
[2]UF-200 pigment manufactured by Cabot Corporation of Boston, Massachusetts.
[3]A 50:50 mixture of Penford Gum 280 manufactured by Penick GRW 12/21/76 & Ford of Cedar Rapids,Iowa and Polyco 2445-polystyrene butadiene latex manufactured by Borden Chemical of Leominster, Massachusetts.

TABLE II

| BROOKFIELD VISCOSITIES OF COATINGS AT 72° F. | | | | | |
|---|---|---|---|---|---|
| Coating | Viscosity [cp] | | | | % Solids |
| RPM | 10 | 20 | 50 | 100 | |
| Example 1 | 100 | 40 | 36 | 32 | 20 |
| Example 2 | 960 | 540 | 264 | 156 | 18 |
| Example 3 | 3,200 | 1,800 | 870 | 515 | 15 |
| Inorganic 4 | 120 | 90 | 72 | 72 | 40 |
| Inorganic 5 | 10 | 12 | 18 | 21 | 40 |
| Thermoplastic 6 | 5 | 10 | 15 | 20 | 40 |

TABLE III

| | PHYSICAL PROPERTIES OF SUPERCALENDERED SHEETS | | | | | | | | | |
|---|---|---|---|---|---|---|---|---|---|---|
| Coating | Gardner 75° Gloss | | Opacity | | K&N Value | | Brightness | | Density of Sheet | |
| No.° Nips/PLI (100° F.) | 4/250 | 4/500 | 4/250 | 4/500 | 4/250 | 4/500 | 4/250 | 4/500 | 4/250 | 4/500 |
| Example 1 | 61.0 | 77.5 | 78.0 | 74.0 | 53.0 | 60.5 | 85.5 | 84.5 | 15.54 | 16.38 |
| Example 2 | 45.0 | 59.5 | 78.0 | 74.0 | 48.0 | 43.5 | 85.0 | 84.5 | 15.54 | 16.58 |
| Example 3 | 25.5 | 38.0 | 77.0 | 74.0 | 46.0 | 52.5 | 84.5 | 84.5 | 15.45 | 16.40 |
| Inorganic 4 | 35.0 | 46.5 | 77.0 | 75.0 | 70.0 | 75.5 | 81.5 | 82.0 | 16.61 | 17.20 |
| Inorganic 5 | 34.0 | 43.0 | 84.0 | 81.0 | 63.0 | 62.5 | 84.0 | 85.0 | 17.15 | 17.57 |
| Thermoplastic 6 | 78.0 | —[1] | 78.0 | — | 62.5 | — | 84.0 | — | 16.46 | — |

[1]No test result due to abrasion of sample caused by calendering conditions.

What is claimed is:

1. In combination with a paper coating of the type wherein pigments, suspended in binder and carrier, are applied to a paper web substrate, followed by calendering on the paper machine at 500 PLI or less, an improved pigment system, consisting of:
   a styrene polymer, in a substantially spherically shaped particulate form having a particle size range of 0.03–0.5 micron in diameter in an amount such that the resulting coated paper has a Gardner 75° gloss of at least about 40; and
   a urea-formaldehyde polymer, in an insoluble, infusible, nonporous, spherically shaped particulate form having a particle size range of 0.1–15 microns in diameter, in an amount of about 25–75% by weight of the total pigment system, wherein the coated finished paper has a K&N ink receptivity brightness of less than about 60.

2. A printing paper product, having a minimum Gardener 75° gloss of at least about 40 and a K&N value of less than about 60, comprising:
   a paper substrate; and a coating on said substrate including a pigment system and a binder attaching said coating to said substrate, wherein said pigment system consists of
a styrene polymer in the form of a particulate of substantially spherical shape having a particle size range of about 0.03–0.5 micron in diameter having a glass transition temperature of greater than about 105° C. and
a urea-formaldehyde polymer that is insoluble, infusible and nonporous in the form of a particulate of substantially spherical shape having a particle size range of about 0.1–15 microns in diameter, wherein said thermosetting polymer comprises at least about 25% but less than about 75% of the total pigment system.

* * * * *